US011194735B2

(12) United States Patent
Friedman et al.

(10) Patent No.: US 11,194,735 B2
(45) Date of Patent: Dec. 7, 2021

(54) TECHNOLOGIES FOR FLEXIBLE VIRTUAL FUNCTION QUEUE ASSIGNMENT

(71) Applicant: Intel Corporation, Santa Clara, CA (US)

(72) Inventors: Ben-Zion Friedman, Jerusalem (IL); Eliel Louzoun, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 920 days.

(21) Appl. No.: 15/720,954

(22) Filed: Sep. 29, 2017

(65) Prior Publication Data

US 2019/0102317 A1    Apr. 4, 2019

(51) Int. Cl.
*G06F 12/00* (2006.01)
*G06F 12/109* (2016.01)
*G06F 9/50* (2006.01)

(52) U.S. Cl.
CPC .......... *G06F 12/109* (2013.01); *G06F 9/5016* (2013.01); *G06F 9/5077* (2013.01); *G06F 2212/657* (2013.01)

(58) Field of Classification Search
CPC .... G06F 12/109; G06F 9/5077; G06F 9/5016; G06F 2212/657; G06F 12/1009; G06F 12/1081; G06F 2212/1041; G06F 9/45558; G06F 9/5038; G06F 2009/4557
USPC ........................................................ 711/203
See application file for complete search history.

(56) References Cited

U.S. PATENT DOCUMENTS

| | | | | |
|---|---|---|---|---|
| 7,797,699 B2 * | 9/2010 | Kagi | ..................... | G06F 9/5011 718/1 |
| 8,924,607 B1 * | 12/2014 | Nanduri | .............. | G06F 12/1081 710/25 |
| 2005/0273571 A1 * | 12/2005 | Lyon | ................... | G06F 12/1072 711/203 |
| 2017/0177222 A1 * | 6/2017 | Singh | .................. | G06F 9/45558 |
| 2018/0349165 A1 * | 12/2018 | Asaro | ................... | G06F 9/4881 |

* cited by examiner

*Primary Examiner* — Mardochee Chery
(74) *Attorney, Agent, or Firm* — Compass IP Law PC

(57) ABSTRACT

Technologies for I/O device virtualization include a computing device with an I/O device that includes a physical function, multiple virtual functions, and multiple assignable resources, such as I/O queues. The physical function assigns an assignable resource to a virtual function. The computing device configures a page table mapping from a virtual function memory page located in a configuration space of the virtual function to a physical function memory page located in a configuration space of the physical function. The virtual function memory page includes a control register for the assignable resource, and the physical function memory page includes another control register for the assignable resource. A value may be written to the control register in the virtual function memory page. A processor of the computing device translates the virtual function memory page to the physical function memory page using the page mapping. Other embodiments are described and claimed.

26 Claims, 5 Drawing Sheets

TECHNOLOGIES FOR FLEXIBLE VIRTUAL FUNCTION QUEUE ASSIGNMENT

BACKGROUND

Typical computer processors include hardware support for virtualization operations. Software virtualization includes transparently executing one or more guest operating systems from within a host operating system or virtual machine monitor (VMM). Hardware virtualization features may include an extended privilege model, hardware-assisted support for virtual memory addressing, support for extended memory permissions, and other virtualization features.

Certain I/O devices such as network cards support single-root I/O virtualization (SR-IOV). An SR-IOV-capable device may include a single physical function and multiple virtual functions, all of which may be implemented as PCIe functions. Guest operating systems or other virtual machines may be assigned to a dedicated virtual function to perform I/O operations. Each virtual function may use shared resources of the I/O device to perform the I/O operations. The physical function may be used by the VMM to manage the I/O device and the virtual functions.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
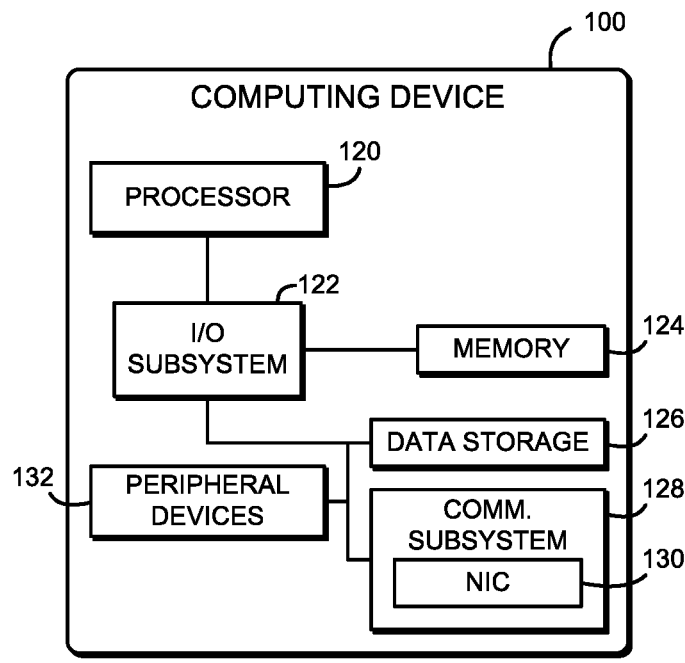
FIG. 1 is a simplified block diagram of at least one embodiment of a computing device for flexible virtual function queue assignment.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims. References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a computing device 100 for flexible virtual function queue management is shown. In use, as described below, the computing device assigns a queue of an I/O device to a virtual function of the I/O device and then configures a page table mapping from a virtual function page associated with the queue to a physical function page associated with the queue. Each of the virtual function page and the physical function page include a single control register associated with the queue. A virtual machine or other guest of the computing device 100 may initiate an I/O operation by writing a register value to the virtual function page. Page table support of the processor of the computing device 100 translates the virtual function page to the physical function page, and the register value is updated in the physical function page. Thus, the computing device 100 allows many queues to be assigned to each virtual function, without requiring on-die translation tables or other physical resources in the network interface controller. The computing device 100 also allows a flexible number of queues to be assigned to each virtual function. Additionally, the computing device 100 allows for non-contiguous assignment of queues to virtual functions, which may improve dynamic queue assignment.

The computing device 100 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively include a processor 120, an input/output subsystem 122, a memory 124, a data storage device 126, and a communication subsystem 128, and/or other components and devices commonly found in a server computer or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100, such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication subsystem 128 of the computing device 100 may be embodied as any communication circuit, device, or collection thereof, capable of enabling communications between the computing device 100 and other remote devices over a network. The communication subsystem 128 may be configured to use any one or more communication technology (e.g., wired or wireless communications) and associated protocols (e.g., Ethernet, InfiniBand®, Bluetooth®, Wi-Fi®, WiMAX, etc.) to effect such communication.

The illustrative communications subsystem 128 includes a network interface controller (NIC) 130. The NIC 130 may be embodied as one or more add-in-boards, daughtercards, controller chips, chipsets, circuits, or other devices that may be used by the computing device 100 for network communications with remote devices. For example, the NIC 130 may be embodied as an expansion card coupled to the I/O subsystem 122 over an expansion bus such as PCI Express.

As another example, in some embodiments the NIC 130 may be embodied as a network controller, host fabric interface, or other component integrated with the I/O subsystem 122, the processor 120, an SoC, and/or one or more other components of the computing device 100. As described further below, the NIC 130 is single-root I/O virtualization (SR-IOV)-capable and thus includes a physical function and multiple virtual functions.

As shown, the computing device 100 may also include one or more peripheral devices 132. The peripheral devices 132 may include any number of additional input/output devices, interface devices, and/or other peripheral devices. For example, in some embodiments, the peripheral devices 132 may include a display, touch screen, graphics circuitry, keyboard, mouse, speaker system, microphone, network interface, and/or other input/output devices, interface devices, and/or peripheral devices.

Figure 2:
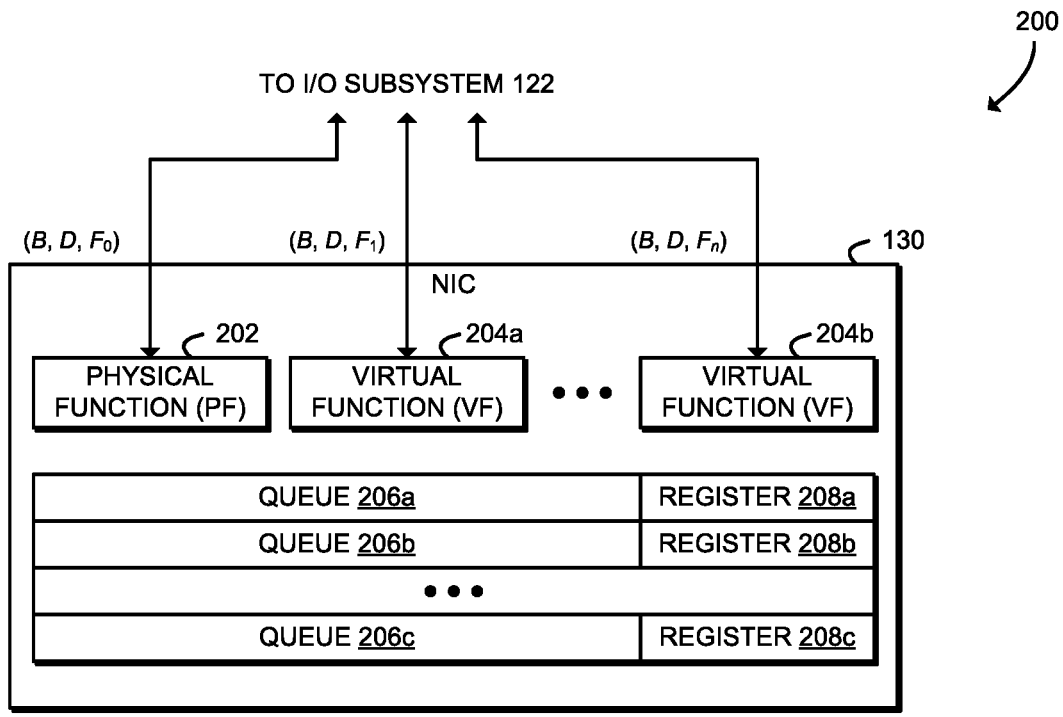
FIG. 2 is a simplified block diagram of a network interface controller of the computing device of FIG. 1.

Referring now to FIG. 2, a schematic diagram 200 of the NIC 130 is shown. The NIC 130 includes a physical function 202 and multiple virtual functions 204. Each of the physical function 202 and virtual functions 204 is a PCI function that is capable of performing DMA operations and otherwise communicating with the I/O subsystem 122. Thus, each of the functions 202, 204 may be addressable with a unique bus address, such as a (bus, device, function) tuple. Illustratively, the physical function 202 may be addressable at function number zero, and the virtual functions 204 may be addressable starting with function number one.

As shown, the NIC 130 includes multiple queues 206. Each queue 206 may be used to cache or otherwise store I/O descriptors or other information used by the NIC 130 to perform I/O transactions. For example, a queue 206 may store memory addresses for memory buffers that include data to be transmitted and/or that are used to store received data. Thus, each queue 206 may be embodied as a receive queue or a transmit queue. As described further below, the physical function 202 may assign one or more queues 206 to a particular virtual function 204.

As shown, each queue 206 is associated with one or more registers 208. The registers 208 may include one or more doorbell registers, such as a tail pointer register and/or a head pointer register. As described further below, guest software executed by the computing device 100 may submit one or more new I/O transactions to the NIC 130 by updating the appropriate doorbell register 208. When a register 208 is updated, hardware of the NIC 130 notifies the virtual function 204 that has been assigned to the updated doorbell register 208, and the virtual function 204 may perform an I/O operation using the associated I/O queue 206.

Figure 3:
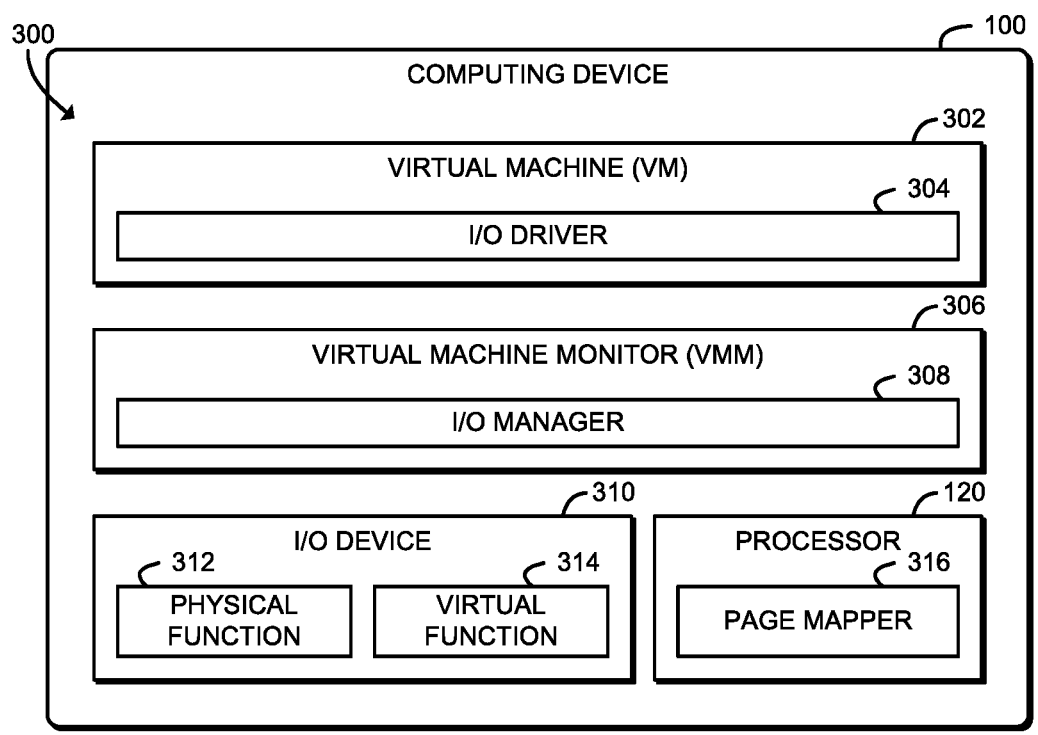
FIG. 3 is a simplified block diagram of at least one embodiment of an environment that may be established by a computing device of FIGS. 1-2.

Referring now to FIG. 3, in an illustrative embodiment, the computing device 100 establishes an environment 300 during operation. The illustrative environment 300 includes a virtual machine (VM) 302, a virtual machine monitor (VMM) 306, an I/O device 310, and the processor 120. As shown, the VM 302 further includes an I/O driver 304, the VMM 306 further includes an I/O manager 308, the I/O device 310 further includes a physical function 312 and a virtual function 314, and the processor 120 further includes a page mapper 316. The various components of the environment 300 may be embodied as hardware, firmware, software, or a combination thereof. As such, in some embodiments, one or more of the components of the environment 300 may be embodied as circuitry or collection of electrical devices (e.g., I/O driver circuitry 304, I/O manager circuitry 308, physical function circuitry 312, virtual function circuitry 314, and/or page mapper circuitry 316). It should be appreciated that, in such embodiments, one or more of the I/O driver circuitry 304, the I/O manager circuitry 308, the physical function circuitry 312, the virtual function circuitry 314, and/or the page mapper circuitry 316 may form a portion of one or more of the processor 120, the I/O subsystem 122, the NIC 130, and/or other components of the computing device 100. Additionally, in some embodiments, one or more of the illustrative components may form a portion of another component and/or one or more of the illustrative components may be independent of one another.

The I/O device 310 may be embodied as the network controller 130, a peripheral device 132, or any other SR-IOV-capable I/O device of the computing device 100. As shown, the I/O device 310 may include the physical function 312 and the virtual function 314. The physical function 312 is configured to assign an assignable resource, such as an I/O queue or an interrupt vector, to the virtual function 314. The physical function 312 may be further configured to un-assign the assignable resource from the virtual function 314.

The VMM 306 may be embodied as any virtual machine monitor, hypervisor, or other component that allows virtualized workloads to be executed on the computing device 100. The VMM 306 may have complete control over the computing device 100, for example by executing in a non-virtualized host mode, such as ringlevel 0 and/or VMX-root mode. As shown, the VMM 306 includes the I/O manager 308. The I/O manager 308 is configured to configure a page table mapping from a virtual function memory page to a physical function memory page. The virtual function memory page is located in a configuration space of the virtual function 314. The virtual function memory page includes a control register for the assignable resource that was assigned to the virtual function 314, such as a doorbell register for an I/O queue or an interrupt register for an interrupt vector. The physical function memory page is located in a configuration space of the physical function 312 and also includes a control register, such as a doorbell register, for the assignable resource assigned to the virtual function 314. In some embodiments, the page table mapping may be embodied as an extended page table (EPT) mapping stored in the memory 124. In those embodiments, the virtual function memory page may be embodied as a guest-physical page and the physical function memory page may be embodied as a host-physical page. Configuring the page table mapping may include allowing write access to the physical function memory page. The I/O manager 308 may be further configured to remove the page table mapping from the virtual function memory page to the physical function memory page in response to un-assignment of the I/O queue.

The VM 302 may be embodied as any guest virtual machine, guest operating system, or other guest software configured to perform a virtualized workload on the computing device 100. As shown, the VM 302 includes the I/O driver 304. The I/O driver 304 may be configured to write an I/O descriptor to an I/O descriptor ring in the memory 124 of the computing device. After writing the I/O descriptor, the I/O driver 304 is configured to write a value to the doorbell register in the virtual function memory page. For example, the I/O driver 304 may write an updated tail pointer value to the doorbell register.

The page mapper 316 is configured to translate, by the processor 120, the virtual function memory page to the physical function memory page using the page table mapping in response to the I/O driver 304 writing the value to the doorbell register. The page mapper 316 is further configured to store the value written by the I/O driver 304 into the doorbell register in the physical function memory page in response to translating the memory pages. Because the physical function memory page is in the configuration space of the physical function 312, the updated value may be provided to the physical function 312 and may not be stored in the memory 124.

The I/O device 310 may be further configured to copy the I/O descriptor from the I/O descriptor ring to the I/O queue in response to storing the value in the doorbell register of the physical function memory page. The virtual function 314 is configured to perform an I/O operation based on the I/O queue in response to storing the value in the doorbell register of the physical function memory page. In some embodiments, the I/O device 310 may copy the I/O descriptor and/or the virtual function 314 may perform the I/O operation at a later time, for example in response to receipt of a data packet.

Figure 4:
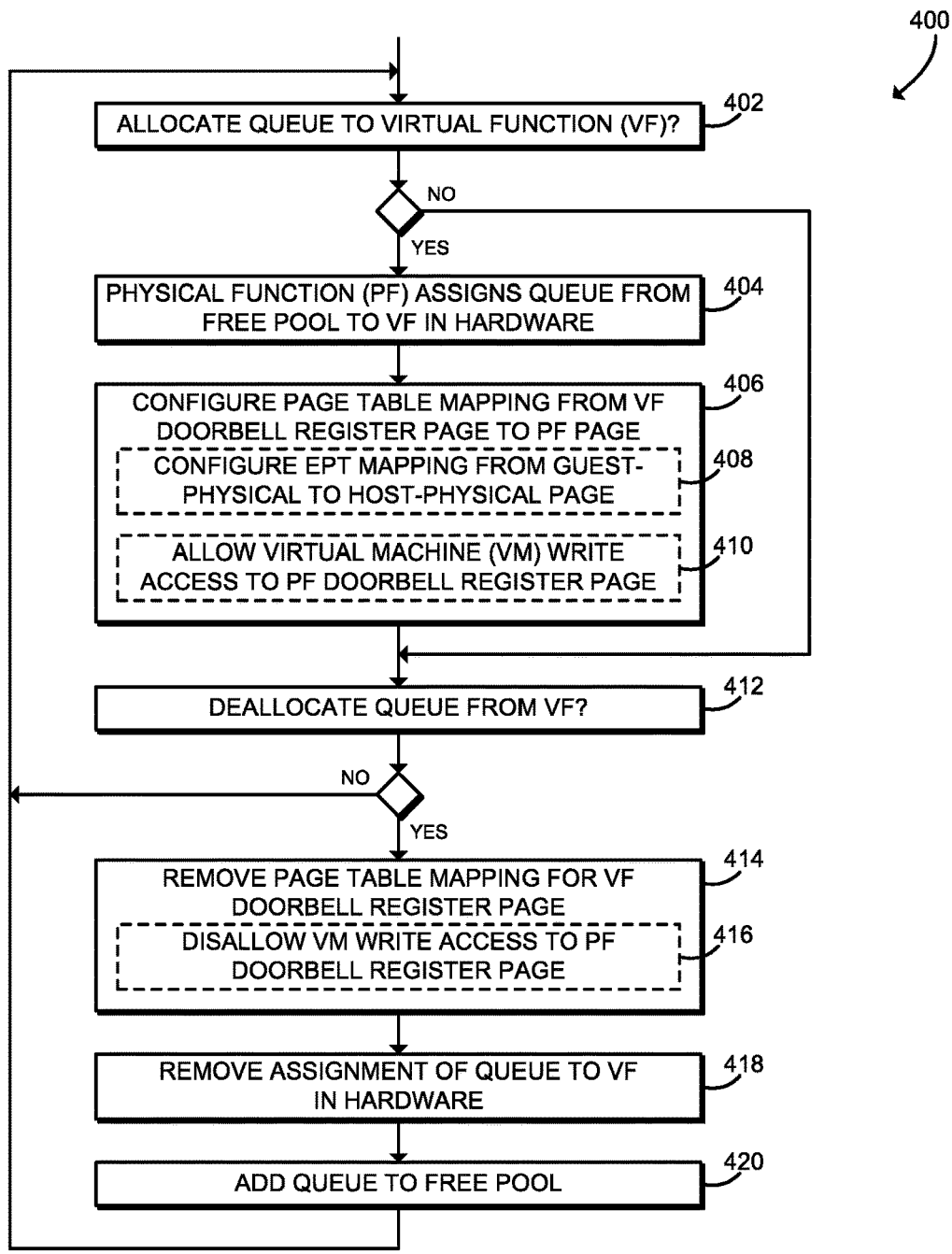
FIG. 4 is a simplified flow diagram of at least one embodiment of a method for configuring virtual function queue assignment that may be executed by the computing device of FIGS. 1-3.

Referring now to FIG. 4, in use, a computing device 100 may execute a method 400 for configuring virtual function queue assignment. It should be appreciated that, in some embodiments, the operations of the method 400 may be performed by one or more components of the environment 300 of the computing device 100 as shown in FIG. 3. The method 400 begins in block 402, in which the computing device 100 determines whether to allocate a queue 206 to a virtual function 204 of the NIC 130. The computing device 100 may use any appropriate criteria to determine whether to allocate queues 206 to a virtual function 204. For example, a particular application, guest operating system, virtual machine, or other entity of the computing device 100 may request a particular number of queues 206 for the virtual function 204. The queues 206 may be allocated to the virtual function 204 during initialization of the computing device 100 and/or dynamically at runtime. If the computing device 100 determines not to allocate a queue 206, the method 400 branches ahead to block 412, described below. If the computing device 100 determines to allocate a queue 206, the method 400 advances to block 404.

In block 404, the physical function 202 of the NIC 130 assigns a queue 206 from a free pool of queues 206 to the virtual function 204 using the hardware of the NIC 130. The physical function 202 may use any technique to manage the free pool, such as maintaining a bitmap, a free list, or another data structure that identifies queues 206 that have not been assigned to virtual functions 204. Similarly, the physical function 202 may use any technique to assign the queue 206 and its associated registers 208 to the virtual function 204 using the hardware of the NIC 130. For example, the physical function 202 may configure a physical switch or other hardware of the NIC to connect the queue 206 and the virtual function 204.

In block 406, the computing device 100 configures a page table mapping from a virtual function doorbell register page associated with the virtual function 204 to a physical function doorbell register page associated with the queue 206. The virtual function 204 establishes a memory-mapped configuration space, such as a PCI configuration space. The virtual function configuration space includes multiple doorbell registers (e.g., tail pointer registers or head pointer registers) at predetermined offsets for each queue 206 that may be assigned to the virtual function 204. Each of the doorbell registers is included in its own virtual function memory page. For example, the virtual function configuration space may include a sequence or other collection of memory pages that each include a doorbell register. The doorbell register pages of the virtual function configuration space may not initially be associated with any particular physical register 208. The physical function 202 also establishes a memory-mapped configuration space that includes multiple doorbell registers that are each included in their own respective memory page. Each of the doorbell registers in the physical function configuration space is associated with a particular physical register 208. Thus, the computing device 100 configures one or more page tables in the memory 124 to map between a register page of the virtual function configuration space to the register page in the physical function configuration space that is associated with the physical register 208 that has been assigned to the virtual function 204.

In some embodiments, in block 408 the computing device 100 may configure an extended page tables (EPT) mapping from a guest-physical page to a host-physical page. The guest-physical page includes the virtual function doorbell register page, and the host physical page includes the physical function doorbell register page. In some embodiments, in block 410 the computing device 100 may configure the EPT mapping to allow write access from a virtual machine 302 to the physical function doorbell register page. After configuring the page table access, software such as a VM 302 may perform I/O operations using the virtual function 204. One potential embodiment of a method for performing I/O operations is described below in connection with FIG. 5.

In block 412, the computing device 100 determines whether to deallocate a queue 206 from a virtual function 204. The computing device 100 may use any appropriate criteria to determine whether to deallocate queues 206 from a virtual function 204. For example, a particular application, virtual machine 302, or other entity of the computing device 100 may request a deallocation of a queue 206. As another example, a queue 206 may be deallocated dynamically when terminating a virtual machine 302. If the computing device 100 determines not to deallocate a queue 206, the method 400 loops back to block 402. If the computing device 100 determines to deallocate a queue 206, the method 400 advances to block 414.

In block 414, the computing device 100 removes a page table mapping from the virtual function doorbell register page to the physical function doorbell register page. The computing device 100 may, for example, delete one or more entries in a page table or EPT in the memory 124. In some embodiments, in block 416 the computing device 100 may configure an EPT mapping to deny write access from a virtual machine 302 to the physical function doorbell register page.

In block 418, the physical function 202 removes an assignment of the queue 206 to the virtual function 204 using the hardware of the NIC 130. The physical function 202 may use any technique to de-assign the queue 206 and its associated registers 208 from the virtual function 204 in the hardware of the NIC 130. For example, the physical function 202 may configure a physical switch or other hardware of the NIC to disconnect the queue 206 from the virtual function 204. In block 420, the physical function 202 adds the queue 206 back to the free pool. After being added to the free pool, the queue 206 may be re-assigned to a different virtual function 204. After deallocating the queue 206, the method 400 loops back to block 402.

Figure 5:
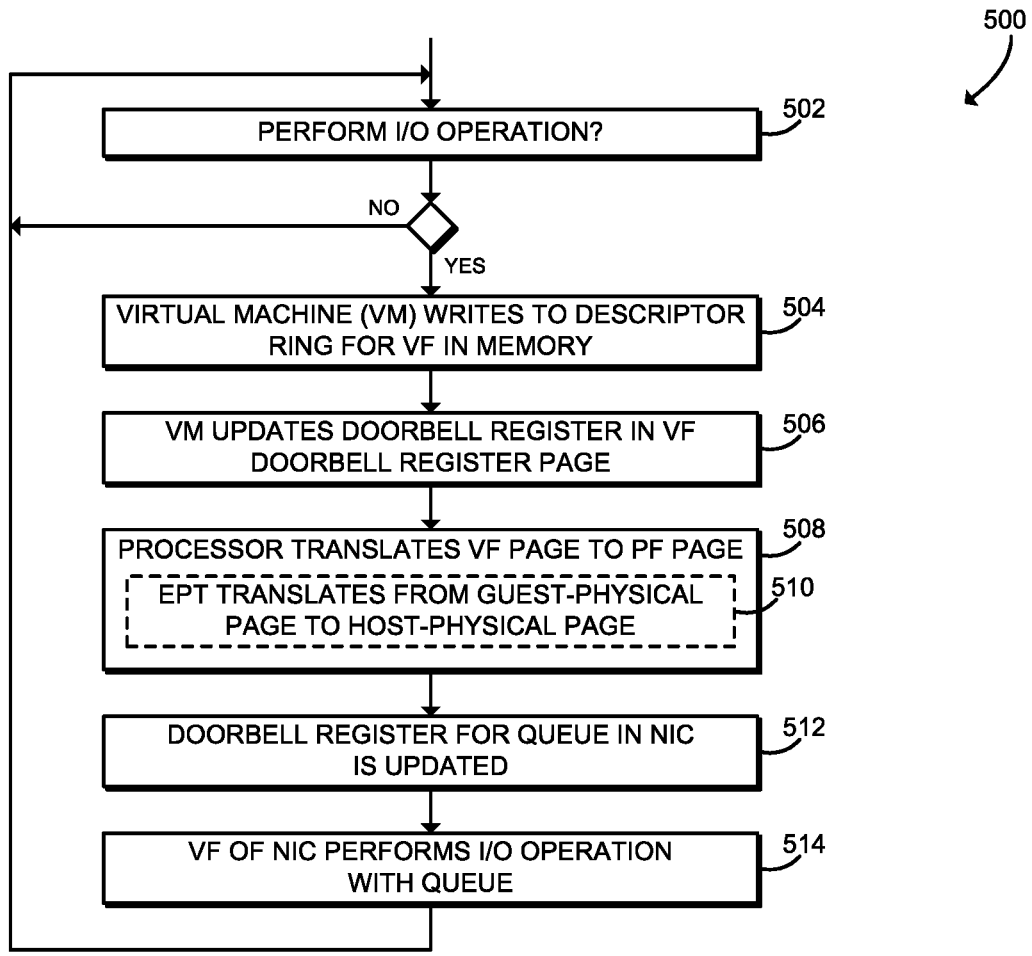
FIG. 5 is a simplified flow diagram of at least one embodiment of a method for performing an I/O operation that may be executed by the computing device of FIGS. 1-3.

Referring now to FIG. 5, in use, a computing device 100 may execute a method 500 for performing an I/O operation. It should be appreciated that, in some embodiments, the operations of the method 500 may be performed by one or more components of the environment 300 of the computing device 100 as shown in FIG. 3. The method 500 begins in block 502, in which the computing device 100 determines whether to perform an I/O operation. For example, the computing device 100 may determine whether an application, operating system, VM 302, or other guest program has requested to send data to a remote device. If the computing device 100 determines not to perform an I/O operation, the method 500 loops back to block 502. If the computing device 100 determines to perform an I/O operation, the method 500 advances to block 504.

In block 504, a VM 302 writes one or more I/O descriptors to a descriptor ring in the memory 124. The I/O descriptors describe the I/O operations to be performed by the NIC 130. For example, each I/O descriptor may identify a memory buffer than includes packet data to be transmitted by the NIC 130. As another example, each I/O descriptor may identify a memory buffer to store packet data received by the NIC 130. The descriptors may be written to the descriptor ring by the I/O driver 304 or other guest software executed by the VM 302.

In block 506, the VM 302 updates a doorbell register in a virtual function doorbell register memory page. For example, the VM 302 may update a tail pointer register to point to the last I/O descriptor added to the descriptor ring. The virtual function doorbell register memory page is associated with a particular virtual function 204 of the NIC 130. The virtual function 204 may be assigned to the VM 302, for example by the VMM 306. The doorbell register may be updated by the I/O driver 304 or other guest software executed by the VM 302.

In block 508, the processor 120 translates the virtual function register page to the associated physical function register page. To translate between the pages, the processor 120 reads a page mapping from the memory 124. The page mapping may be configured by the computing device 100 as described above in connection with FIG. 4. The page translation may be performed by a memory management unit (MMU) or other hardware, firmware, and/or microcode resources of the processor 120. Thus, the page translation may be transparent to software of the computing device 100 such as the virtual machine 302. In some embodiments, in block 510, the processor 120 may read one or more extended page tables (EPT) and translate from a guest-physical page to a host-physical page. The EPT translation may provide an additional level of address translation that is useful for virtualization environments.

In block 512, the doorbell register 208 associated with the queue 206 in the NIC 130 is updated. For example, the processor 120 may generate an MMIO transaction to the doorbell register in the configuration space of the physical function 202. As described above, the doorbell register in the configuration space of the physical function 202 may be mapped to a particular host physical memory page. Updating the register 208 causes hardware of the NIC 130 to notify the associated virtual function 204. In block 514, the virtual function 204 of the NIC 130 that has been associated with the queue 206 performs an I/O operation using the queue 206. For example, the virtual function 204 may copy one or more I/O descriptors from the descriptor ring in the memory 124 into the queue 206 and then perform the I/O operations described by the I/O descriptors. After performing the I/O operations, the method 500 loops back to block 502 to continue monitoring for additional I/O operations. Additionally or alternatively, although illustrated as performing the operations of FIG. 5 in sequence, it should be understood that in some embodiments those operations may be performed at different times and/or in different orders. For example, to receive data, the descriptor ring may be populated with I/O descriptors prior to performing an I/O operation, so that the descriptors are prepared in case a received data packet arrives. Thus, in those embodiments the operations of blocks 504 to 512 may occur ahead of time, before a packet is received. As another example, for receiving packets, the NIC 130 may perform the I/O operation in response to an update of the doorbell register (for prefetch embodiments) or in response to receipt of a data packet for the queue (for just-in-time fetch embodiments).

Figure 6:
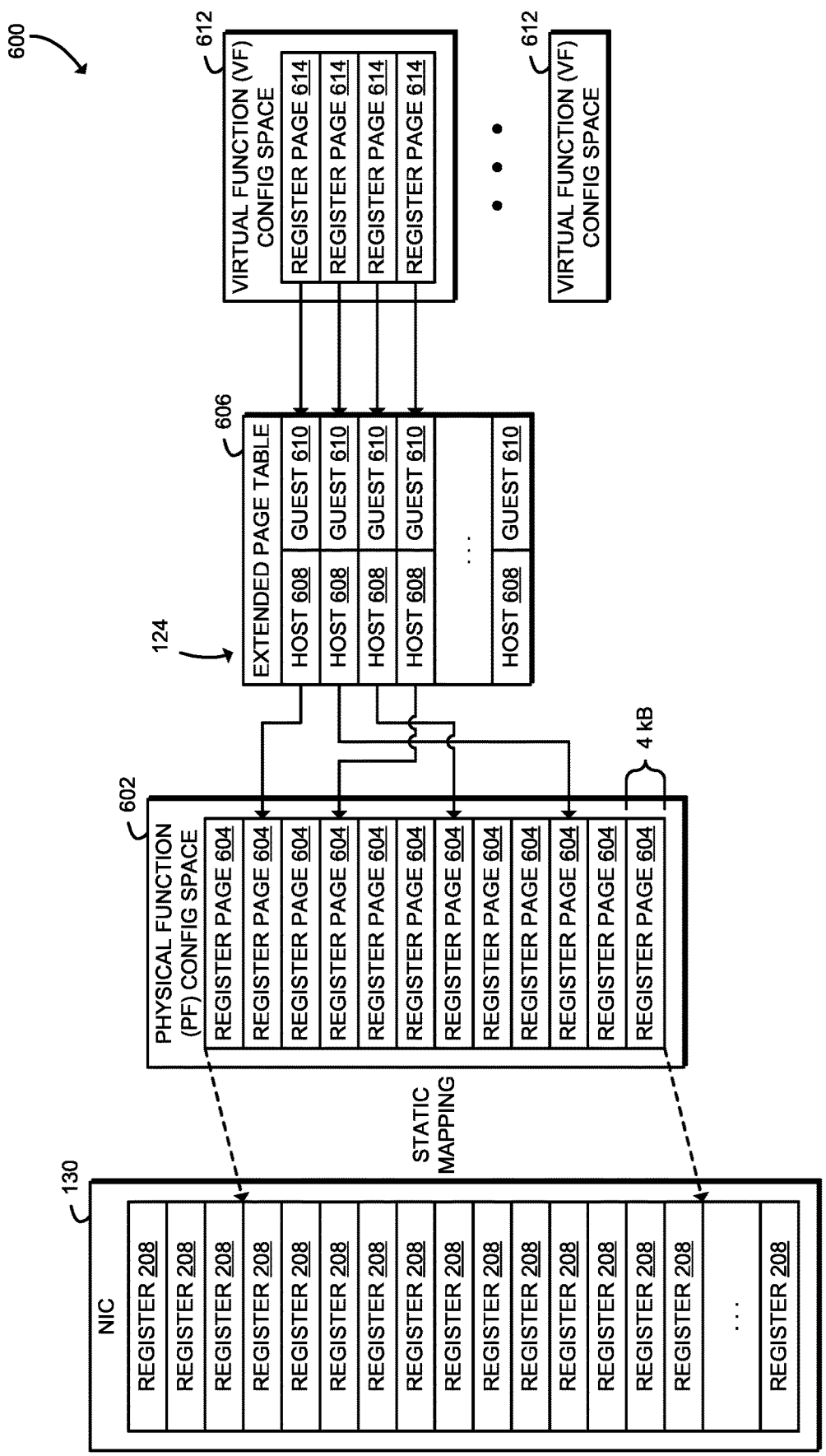
FIG. 6 is a schematic diagram of a page table mapping that may be established by the computing device of FIGS. 1-3.

Referring now to FIG. 6, schematic diagram 600 illustrates a page table mapping that may be established by the computing device 100. As shown, the NIC 130 includes multiple doorbell registers 208. As described above, doorbell register 208 is associated with a queue 206 and may be used to communicate between software (e.g., a VM 302) and hardware (e.g., a virtual function 204 of the NIC 130). The physical function 202 of the NIC 130 establishes a physical function (PF) configuration space 602. The PF configuration space 602 may be embodied as a PCI configuration space or any other memory-mapped configuration space associated with the PF 202. As shown, the PF configuration space 602 includes multiple register pages 604. Each register page 604 is illustratively a 4 kB page; however, any appropriate page size supported by the processor 120 may be used in other embodiments. Each register page 604 includes an address associated with a single register 208 and/or a single register set (e.g., for interrupt registers). Because the register pages 604 are included in a memory-mapped configuration space, there is no need to include or otherwise reserve a full page (e.g., 4 kB) of physical memory or other resources to back each register page 604. The register pages 604 are illustratively statically mapped to the registers 208; however, in other embodiments the registers 208 may be assigned to the register pages 604 during initialization or otherwise.

As shown, each virtual function 204 of the NIC 130 establishes a VF configuration space 612. Similar to the PF configuration space 606, the VF configuration space 612 also includes multiple register pages 614. Each register page 614 may be associated with a queue 206 that has been assigned to the VF 204 as described above in connection with FIG. 4.

An extended page table 606 is established in the memory 124. Each entry of the extended page table 606 identifies a host page 608 and a corresponding guest page 610. As shown, the guest pages 610 correspond to the register pages 614 of the VF configuration space 612, and the host pages 608 correspond to the register pages 604 of the PF configuration space 602. Thus, the EPT 606 may be used by the processor 120 to translate accesses to a VF register page 614 into corresponding accesses to a PF register page 604. Thus, guest software such as a VM 302 may access queues of the VF 204 through a register page 614 of the VF configuration space 612. The processor 120 translates an access to a guest register page 614 into an access to a register page 604 of the PF configuration space 602. The register page 604 may be used to access the physical register 208 of the NIC 130. That register 208 is assigned or otherwise connected in hardware to the corresponding VF 204. Accordingly, accesses to the VF configuration space 612 may be translated to the PF configuration space 602 using page tables stored in the memory 124, without including translation tables or other resources on the die of the NIC 130.

Although illustrated as mapping doorbell registers 208 for I/O queues 206, it should be understood that the same technique may be used for mapping control registers for any assignable resource of the NIC 130. For example, the disclosed techniques may be used to map interrupt registers that are used to control interrupt vectors.

It should be appreciated that, in some embodiments, the methods 400 and/or 500 may be embodied as various instructions stored on a computer-readable media, which may be executed by the processor 120, the I/O subsystem 122, the NIC 130, and/or other components of a computing device 100 to cause the computing device 100 to perform the respective method 400 and/or 500. The computer-readable media may be embodied as any type of media capable of being read by the computing device 100 including, but not limited to, the memory 124, the data storage device 126, firmware devices, and/or other media.

EXAMPLES

Illustrative examples of the technologies disclosed herein are provided below. An embodiment of the technologies may include any one or more, and any combination of, the examples described below.

Example 1 includes a computing device for I/O device virtualization, the computing device comprising: one or more processors; an I/O device that includes a physical function, a first virtual function, and an assignable resource, wherein the physical function is to assign the assignable resource to the first virtual function; and one or more memory devices having stored therein a plurality of instructions that, when executed by the one or more processors, cause the computing device to configure a page table mapping from a first memory page to a second memory page, wherein the first memory page is located in a configuration space of the first virtual function and comprises a first control register for the assignable resource, and wherein the second memory page is located in a configuration space of the physical function and comprises a second control register for the assignable resource.

Example 2 includes the subject matter of Example 1, and wherein: the page table mapping comprises an extended page table mapping included in a memory of the computing device; the first memory page comprises a guest-physical page; and the second memory page comprises a host-physical page.

Example 3 includes the subject matter of any of Examples 1 and 2, and wherein to configure the page table mapping further comprises to allow write access to the second memory page.

Example 4 includes the subject matter of any of Examples 1-3, and wherein: the physical function is further to un-assign the assignable resource from the first virtual function; and the plurality of instructions, when executed, further cause the computing device to remove the page table mapping from the first memory page to the second memory page in response to un-assignment of the assignable resource.

Example 5 includes the subject matter of any of Examples 1-4, and wherein: the assignable resource comprises an I/O queue; the first control register comprises a first doorbell register; and the second control register comprises a second doorbell register.

Example 6 includes the subject matter of any of Examples 1-5, and wherein the first doorbell register comprises a tail pointer register or a head pointer register.

Example 7 includes the subject matter of any of Examples 1-6, and wherein: the plurality of instructions, when executed, further cause the computing device to write a first value to the first doorbell register in the first memory page in response to configuration of the page table mapping; and a processor of the computing device is to (i) translate the first memory page to the second memory page with the page table mapping in response to a write the value to the first doorbell register, and (ii) store the first value in the second doorbell register in response to translation of the first memory page to the second memory page.

Example 8 includes the subject matter of any of Examples 1-7, and wherein the first virtual function is to perform an I/O operation based on the I/O queue in response to storage of the first value in the second doorbell register.

Example 9 includes the subject matter of any of Examples 1-8, and wherein to write the first value to the first doorbell register comprises to write the first value by a first virtual machine of the computing device, wherein the first virtual machine is associated with the first virtual function.

Example 10 includes the subject matter of any of Examples 1-9, and wherein: the plurality of instructions, when executed, further cause the computing device to write, by the virtual machine, an I/O descriptor to an I/O descriptor ring in a memory of the computing device; and to write the first value to the first doorbell register comprises to write the first value to the first doorbell register in response to a write of the I/O descriptor to the I/O descriptor ring.

Example 11 includes the subject matter of any of Examples 1-10, and wherein the I/O device is further to copy the I/O descriptor from the I/O descriptor ring to the I/O queue in response to storage of the first value in the second doorbell register.

Example 12 includes the subject matter of any of Examples 1-11, and wherein the I/O device comprises a network interface controller.

Example 13 includes a method for I/O device virtualization, the method comprising: assigning, by a physical function of an I/O device of a computing device, an assignable resource of the I/O device to a first virtual function of the I/O device; and configuring, by the computing device, a page table mapping from a first memory page to a second memory page, wherein the first memory page is located in a configuration space of the first virtual function and comprises a first control register for the assignable resource, and wherein the second memory page is located in a configuration space of the physical function and comprises a second control register for the assignable resource.

Example 14 includes the subject matter of Example 13, and wherein: the page table mapping comprises an extended page table mapping included in a memory of the computing device; the first memory page comprises a guest-physical page; and the second memory page comprises a host-physical page.

Example 15 includes the subject matter of any of Examples 13 and 14, and wherein configuring the page table mapping further comprises allowing write access to the second memory page.

Example 16 includes the subject matter of any of Examples 13-15, and further comprising: un-assigning, by the physical function, the assignable resource of the I/O device from the first virtual function; and removing, by the computing device, the page table mapping from the first memory page to the second memory page in response to un-assigning the I/O queue.

Example 17 includes the subject matter of any of Examples 13-16, and wherein: the assignable resource comprises an I/O queue; the first control register comprises a first doorbell register; and the second control register comprises a second doorbell register.

Example 18 includes the subject matter of any of Examples 13-17, and wherein the first doorbell register comprises a tail pointer register or a head pointer register.

Example 19 includes the subject matter of any of Examples 13-18, and further comprising: writing, by the computing device, a first value to the first doorbell register in the first memory page in response to configuring the page table mapping; translating, by a processor of the computing device, the first memory page to the second memory page using the page table mapping in response to writing the value to the first doorbell register; and storing, by the computing device, the first value in the second doorbell register in response to translating the first memory page to the second memory page.

Example 20 includes the subject matter of any of Examples 13-19, and further comprising performing, by the first virtual function, an I/O operation based on the I/O queue in response to storing the first value in the second doorbell register.

Example 21 includes the subject matter of any of Examples 13-20, and wherein writing the first value to the first doorbell register comprises writing the first value by a first virtual machine of the computing device, wherein the first virtual machine is associated with the first virtual function.

Example 22 includes the subject matter of any of Examples 13-21, and further comprising: writing, by the virtual machine, an I/O descriptor to an I/O descriptor ring in a memory of the computing device; wherein writing the first value to the first doorbell register comprises writing the first value to the first doorbell register in response to writing the I/O descriptor to the I/O descriptor ring.

Example 23 includes the subject matter of any of Examples 13-22, and further comprising copying, by the I/O device, the I/O descriptor from the I/O descriptor ring to the I/O queue in response to storing the first value in the second doorbell register.

Example 24 includes the subject matter of any of Examples 13-23, and wherein the I/O device comprises a network interface controller.

Example 25 includes a computing device comprising: a processor; and a memory having stored therein a plurality of instructions that when executed by the processor cause the computing device to perform the method of any of Examples 13-24.

Example 26 includes one or more non-transitory, computer readable storage media comprising a plurality of instructions stored thereon that in response to being executed result in a computing device performing the method of any of Examples 13-24.

Example 27 includes a computing device comprising means for performing the method of any of Examples 13-24.

Example 28 includes a computing device for I/O device virtualization, the computing device comprising: an I/O device that includes a physical function, a first virtual function, and an assignable resource, wherein the physical function is to assign the assignable resource to the first virtual function; and an I/O manager to configure a page table mapping from a first memory page to a second memory page, wherein the first memory page is located in a configuration space of the first virtual function and comprises a first control register for the assignable resource, and wherein the second memory page is located in a configuration space of the physical function and comprises a second control register for the assignable resource.

Example 29 includes the subject matter of Example 28, and wherein: the page table mapping comprises an extended page table mapping included in a memory of the computing device; the first memory page comprises a guest-physical page; and the second memory page comprises a host-physical page.

Example 30 includes the subject matter of any of Examples 28 and 29, and wherein to configure the page table mapping further comprises to allow write access to the second memory page.

Example 31 includes the subject matter of any of Examples 28-30, and wherein: the physical function is further to un-assign the assignable resource from the first virtual function; and the I/O manager is further to remove the page table mapping from the first memory page to the second memory page in response to un-assignment of the assignable resource.

Example 32 includes the subject matter of any of Examples 28-31, and wherein: the assignable resource comprises an I/O queue; the first control register comprises a first doorbell register; and the second control register comprises a second doorbell register.

Example 33 includes the subject matter of any of Examples 28-32, and wherein the first doorbell register comprises a tail pointer register or a head pointer register.

Example 34 includes the subject matter of any of Examples 28-33, and further comprising: an I/O driver to write a first value to the first doorbell register in the first memory page in response to configuration of the page table mapping; and a page mapper to (i) translate, by a processor of the computing device, the first memory page to the second memory page with the page table mapping in response to a write the value to the first doorbell register, and (ii) store the first value in the second doorbell register in response to translation of the first memory page to the second memory page.

Example 35 includes the subject matter of any of Examples 28-34, and wherein the first virtual function is to perform an I/O operation based on the I/O queue in response to storage of the first value in the second doorbell register.

Example 36 includes the subject matter of any of Examples 28-35, and wherein to write the first value to the first doorbell register comprises to write the first value by a first virtual machine of the computing device, wherein the first virtual machine is associated with the first virtual function.

Example 37 includes the subject matter of any of Examples 28-36, and wherein: the I/O driver is further to write, by the virtual machine, an I/O descriptor to an I/O descriptor ring in a memory of the computing device; and to write the first value to the first doorbell register comprises to write the first value to the first doorbell register in response to a write of the I/O descriptor to the I/O descriptor ring.

Example 38 includes the subject matter of any of Examples 28-37, and wherein the I/O device is further to copy the I/O descriptor from the I/O descriptor ring to the I/O queue in response to storage of the first value in the second doorbell register.

Example 39 includes the subject matter of any of Examples 28-38, and wherein the I/O device comprises a network interface controller.

Example 40 includes a computing device for I/O device virtualization, the computing device comprising: circuitry for assigning, by a physical function of an I/O device of the computing device, an assignable resource of the I/O device to a first virtual function of the I/O device; and means for configuring a page table mapping from a first memory page to a second memory page, wherein the first memory page is located in a configuration space of the first virtual function and comprises a first control register for the assignable resource, and wherein the second memory page is located in a configuration space of the physical function and comprises a second control register for the assignable resource.

Example 41 includes the subject matter of Example 40, and wherein: the page table mapping comprises an extended page table mapping included in a memory of the computing device; the first memory page comprises a guest-physical page; and the second memory page comprises a host-physical page.

Example 42 includes the subject matter of any of Examples 40 and 41, and wherein the means for configuring the page table mapping further comprises means for allowing write access to the second memory page.

Example 43 includes the subject matter of any of Examples 40-42, and further comprising: circuitry for un-assigning, by the physical function, the assignable resource of the I/O device from the first virtual function; and means for removing the page table mapping from the first memory page to the second memory page in response to un-assigning the I/O queue.

Example 44 includes the subject matter of any of Examples 40-43, and wherein: the assignable resource comprises an I/O queue; the first control register comprises a first doorbell register; and the second control register comprises a second doorbell register.

Example 45 includes the subject matter of any of Examples 40-44, and wherein the first doorbell register comprises a tail pointer register or a head pointer register.

Example 46 includes the subject matter of any of Examples 40-45, and further comprising: means for writing a first value to the first doorbell register in the first memory page in response to configuring the page table mapping; circuitry for translating, by a processor of the computing device, the first memory page to the second memory page using the page table mapping in response to writing the value to the first doorbell register; and circuitry for storing the first value in the second doorbell register in response to translating the first memory page to the second memory page.

Example 47 includes the subject matter of any of Examples 40-46, and further comprising means for performing, by the first virtual function, an I/O operation based on the I/O queue in response to storing the first value in the second doorbell register.

Example 48 includes the subject matter of any of Examples 40-47, and wherein the means for writing the first value to the first doorbell register comprises means for writing the first value by a first virtual machine of the computing device, wherein the first virtual machine is associated with the first virtual function.

Example 49 includes the subject matter of any of Examples 40-48, and further comprising: means for writing, by the virtual machine, an I/O descriptor to an I/O descriptor ring in a memory of the computing device; wherein the means for writing the first value to the first doorbell register comprises means for writing the first value to the first doorbell register in response to writing the I/O descriptor to the I/O descriptor ring.

Example 50 includes the subject matter of any of Examples 40-49, and further comprising means for copying, by the I/O device, the I/O descriptor from the I/O descriptor ring to the I/O queue in response to storing the first value in the second doorbell register.

Example 51 includes the subject matter of any of Examples 40-50, and wherein the I/O device comprises a network interface controller.

The invention claimed is:

1. A computing device for input/output (I/O) device virtualization, the computing device comprising:

one or more processors;
a network interface controller that includes a physical function, a first virtual function, and an I/O queue, wherein the physical function is to assign the I/O queue to the first virtual function; and
one or more memory devices having stored therein a plurality of instructions that, when executed by the one or more processors, cause the computing device to
configure a page table mapping from a first memory page to a second memory page, wherein the first memory page is located in a configuration space of the first virtual function and includes a first doorbell register for access to the I/O queue, and wherein the second memory page is located in a configuration space of the physical function and includes a second doorbell register for the I/O queue,
cause the computing device to write a first value to the first doorbell register in the first memory page in response to configuration of the page table mapping,
cause a processor from among the one or more processors to translate the first memory page to the second memory page with the page table mapping responsive to a write of the first value to the first doorbell register, and
store the first value in the second doorbell register in response to translation of the first memory page to the second memory page.

2. The computing device of claim 1, wherein:
the page table mapping comprises an extended page table mapping included in a memory of the computing device;
the first memory page comprises a guest-physical page; and
the second memory page comprises a host-physical page.

3. The computing device of claim 1, wherein to configure the page table mapping further comprises to allow write access to the second memory page.

4. The computing device of claim 1, wherein:
the physical function is further to un-assign the I/O queue from the first virtual function; and
the plurality of instructions, when executed, further cause the computing device to remove the page table mapping from the first memory page to the second memory page in response to un-assignment of the I/O queue.

5. The computing device of claim 1, wherein the first doorbell register comprises a tail pointer register or a head pointer register.

6. The computing device of claim 1, wherein the first virtual function is to perform an I/O operation based on the I/O queue in response to storage of the first value in the second doorbell register.

7. The computing device of claim 1, wherein to write the first value to the first doorbell register comprises to write the first value by a first virtual machine of the computing device, wherein the first virtual machine is associated with the first virtual function.

8. The computing device of claim 7, wherein:
the plurality of instructions, when executed, further cause the computing device to write, by the first virtual machine, an I/O descriptor to an I/O descriptor ring in a memory of the computing device; and
to write the first value to the first doorbell register comprises to write the first value to the first doorbell register in response to a write of the I/O descriptor to the I/O descriptor ring.

9. The computing device of claim 8, wherein the I/O device is further to copy the I/O descriptor from the I/O descriptor ring to the I/O queue in response to storage of the first value in the second doorbell register.

10. One or more non-transitory machine-readable storage media comprising a plurality of instructions stored thereon that, in response to being executed, cause a computing device to:
assign, by a physical function of a network interface controller (NIC) of the computing device, an input/output (I/O) queue of the NIC to a first virtual function of the NIC; and
configure a page table mapping from a first memory page to a second memory page, wherein the first memory page is located in a configuration space of the first virtual function and includes a first doorbell register for access to the I/O queue, and wherein the second memory page is located in a configuration space of the physical function and includes a second doorbell register for access to the I/O queue;
write a first value to the first doorbell register in the first memory page in response to configuring the page table mapping;
cause a translation by a processor of the computing device of the first memory page to the second memory page using the page table mapping responsive to writing the first value to the first doorbell register; and
store the first value in the second doorbell register in response to the translation of the first memory page to the second memory page.

11. The one or more non-transitory machine-readable storage media of claim 10, wherein:
the page table mapping comprises an extended page table mapping included in a memory of the computing device;
the first memory page comprises a guest-physical page; and
the second memory page comprises a host-physical page.

12. The one or more non-transitory machine-readable storage media of claim 10, wherein to configure the page table mapping further comprises to allow write access to the second memory page.

13. The one or more non-transitory machine-readable storage media of claim 10, further comprising a plurality of instructions stored thereon that, in response to being executed, cause the computing device to:
un-assign, by the physical function, the I/O queue of the NIC from the first virtual function; and
remove the page table mapping from the first memory page to the second memory page in response to un-assigning the I/O queue.

14. The one or more non-transitory machine-readable storage media of claim 10, wherein the first doorbell register comprises a tail pointer register or a head pointer register.

15. The one or more non-transitory machine-readable storage media of claim 10, further comprising a plurality of instructions stored thereon that, in response to being executed, cause the computing device to perform, by the first virtual function, an I/O operation based on the I/O queue in response to storing the first value in the second doorbell register.

16. The one or more non-transitory machine-readable storage media of claim 10, wherein to write the first value to the first doorbell register comprises to write the first value by a first virtual machine of the computing device, wherein the first virtual machine is associated with the first virtual function.

17. The one or more non-transitory machine-readable storage media of claim 16, further comprising a plurality of instructions stored thereon that, in response to being executed, cause the computing device to:

write, by the first virtual machine, an I/O descriptor to an I/O descriptor ring in a memory of the computing device;

wherein to write the first value to the first doorbell register comprises to write the first value to the first doorbell register in response to writing the I/O descriptor to the I/O descriptor ring.

18. A computing device for input/output (I/O) device virtualization, the computing device comprising:

circuitry for assigning, by a physical function of a network interface controller (NIC) of the computing device, an I/O queue of the NIC to a first virtual function of the NIC;

means for configuring a page table mapping from a first memory page to a second memory page, wherein the first memory page is located in a configuration space of the first virtual function and includes a first doorbell register for access to the I/O queue, and wherein the second memory page is located in a configuration space of the physical function and includes a second doorbell register for the I/O queue;

means for causing the computing device to write a first value to the first doorbell register in the first memory page in response to configuration of the page table mapping, means for causing a translation by a processor of the computing device of the first memory page to the second memory page with the page table mapping responsive to writing the first value to the first doorbell register; and means for causing the first value to be stored in the second doorbell register in response to the translation of the first memory page to the second memory page.

19. A method for input/output (I/O) device virtualization, the method comprising:

assigning, by a physical function of a network interface controller (NIC) of a computing device, an input/output (I/O) queue of the NIC to a first virtual function of the NIC; and configuring, by the computing device, a page table mapping from a first memory page to a second memory page, wherein the first memory page is located in a configuration space of the first virtual function and includes a first doorbell register for access to the I/O queue, and wherein the second memory page is located in a configuration space of the physical function and includes a second doorbell register for the I/O queue;

writing, by the computing device, a first value to the first doorbell register in the first memory page in response to configuring the page table mapping;

translating, by a processor of the computing device, the first memory page to the second memory page using the page table mapping in response to writing the first value to the first doorbell register; and storing, by the computing device, the first value in the second doorbell register in response to translating the first memory page to the second memory page.

20. The method of claim 19, wherein:

the page table mapping comprises an extended page table mapping included in a memory of the computing device;

the first memory page comprises a guest-physical page; and the second memory page comprises a host-physical page.

21. The method of claim 19, further comprising:

un-assigning, by the physical function, the I/O queue of the NIC from the first virtual function; and removing, by the computing device, the page table mapping from the first memory page to the second memory page in response to un-assigning the I/O queue.

22. One or more non-transitory machine-readable storage media comprising a plurality of instructions stored thereon that, in response to being executed, cause a computing device to:

configure a page table mapping to include a mapping from a first memory page to a second memory page, the first memory page to include a virtual function doorbell register associated with a virtual function accessing a network interface controller (NIC) queue assigned to the virtual function, the second memory page to include a physical function doorbell register associated with a physical function that assigned the NIC queue to the virtual function;

write a first value to the virtual function doorbell register in the first memory page in response to configuration of the page table mapping;

responsive to the writing of the first value to the virtual function doorbell register, cause a processor of the computing device to use the page table mapping to translate the first memory page to the second memory page; and store the first value in the physical function doorbell register responsive to the translation of the first memory page to the second memory page.

23. The one or more non-transitory machine-readable storage media of claim 22, wherein:

the page table mapping comprises an extended page table mapping included in a memory of the computing device;

the first memory page comprises a guest-physical page; and the second memory page comprises a host-physical page.

24. The one or more non-transitory machine-readable storage media of claim 22, wherein the virtual function doorbell register comprises a tail pointer register or a head pointer register.

25. The one or more non-transitory machine-readable storage media of claim 22, comprising the virtual function associated with a virtual machine.

26. The one or more non-transitory machine-readable storage media of claim 25, comprising the virtual machine to write the first value to the virtual function doorbell register in response to writing an I/O descriptor to an I/O descriptor ring in a memory of the computing device.

* * * * *